United States Patent
Sindile

(10) Patent No.: US 7,245,829 B1
(45) Date of Patent: Jul. 17, 2007

(54) ARCHITECTURE FOR DYNAMIC CONNECTIVITY IN AN EDGE PHOTONIC NETWORK ARCHITECTURE

(75) Inventor: Pia Sindile, Ottawa (CA)

(73) Assignee: Nortel Networks Limited, St. Laurent, Quebec ( * ) Notice: Subject to any disclaimer, the term of this patent is extended or adjusted under 35 U.S.C. 154(b) by 628 days.

(21) Appl. No.: 10/755,573

(22) Filed: Jan. 12, 2004

(51) Int. Cl.
*H04J 14/00* (2006.01)
*H04J 14/02* (2006.01)

(52) U.S. Cl. ............... 398/45; 398/48; 398/49; 398/50; 398/91

(58) Field of Classification Search ............ 398/45, 398/48–50, 55–57, 82, 91, 141
See application file for complete search history.

(56) References Cited

U.S. PATENT DOCUMENTS

| | | | | |
|---|---|---|---|---|
| 6,751,372 | B2* | 6/2004 | Feuer et al. | 385/24 |
| 7,092,642 | B2* | 8/2006 | Way | 398/193 |
| 2002/0030869 | A1* | 3/2002 | Okazaki et al. | 359/128 |
| 2003/0007208 | A1* | 1/2003 | Shibagaki et al. | 359/124 |

* cited by examiner

*Primary Examiner*—Dalzid Singh
(74) *Attorney, Agent, or Firm*—Ridout & Maybee LLP

(57) ABSTRACT

A network arrangement for aggregation of groups of tunable sources in a photonic network is disclosed. The network arrangement includes transmit edge elements having a plurality of tunable optical transmitters, an optical switch and a cyclic optical multiplexer, and receive edge elements having optical demultiplexers, optical switches and a plurality of optical receivers. A variety of arrangements are disclosed including protected and unprotected network architectures. The network arrangement disclosed is particularly useful for overcoming the problem of scaling a photonic network.

19 Claims, 10 Drawing Sheets

Figure 1 - Prior Art

ARCHITECTURE FOR DYNAMIC CONNECTIVITY IN AN EDGE PHOTONIC NETWORK ARCHITECTURE

FIELD OF THE INVENTION

The present invention relates to aggregation of groups of tunable sources in a photonic network and is particularly concerned with provision of optical network connections between elements in a photonic network without the use of optical-to-electrical-to-optical conversion.

BACKGROUND OF THE INVENTION

Presently existing optical networks include optical-to-electrical-to-optical (OEO) conversion at many points. A typical wavelength switch used today converts the input light signal into an electronic signal to detect the routing information, switches the electronic signal, and then eventually reconverts it back into a light signal for further transmission. This device, commonly referred to as an Optical-Electrical-Optical (OEO) switch, not only depends on current semiconductor technologies and processes, but also requires a transmitter and a receiver for each transmission port. These factors cause OEO switches to be large in size, to have high power consumption in the range of kilowatts, to be network protocol and transmission rate dependent, to lack scalability, and to be costly.

All-optical networks encounter issues of aggregating and disaggregating communication channels. Power combiners may be used to aggregate channels, but have the inherent problem of introducing high loss as channels are aggregated. Overcoming losses with all-optical amplifiers introduces noise. This issue is exacerbated as networks are scaled to larger sizes and denser frequencies, from systems with 32 optical channels with 100 GHz channel spacing, through 128 channel systems with 25 GHz channel spacing. This trending towards denser and denser frequencies is expected to continue as systems expand beyond the existing use of C-band into L-band.

Therefore, what is required is a method or system which would allow the network to establish photonic connections without the necessity of intermediate OEO conversion yet also allow effective scaling of the network to larger and larger networks.

SUMMARY OF THE INVENTION

The architecture of the invention allows ready optical connectivity between any transmitter and any receiver. The network contains transmit edge elements having tunable optical transmitters, optical switches, and cyclic multiplexers; as well receive edge elements having demultiplexers, optical switches and optical receivers. In general a default wavelength is associated with a particular receiver and the remainder of the network attempts to establish connectivity via that wavelength. Receivers are grouped into customer groups, and a set of wavelengths associated with a customer group forms a wavelength group. Where a particular default wavelength is already in use, connectivity with a receiver may be established using an alternative wavelength in the wavelength group.

Therefore, according to an aspect of the invention there is provided an optical network having a transmit edge element and a receive edge element. The transmit edge element has a plurality of tunable optical transmitters, an optical switch having separate inputs each optically connected to an output of one of the plurality of tunable optical transmitters, and a cyclic optical multiplexer having separate inputs each optically connected to a separate output of the optical switch. The output of the cyclic optical multiplexer constitutes the output of said transmit edge element. The receive edge element has an optical demultiplexer wherein the input of the optical demultiplexer constitutes the input of the receive edge element, an optical switch having separate inputs optically connected to the separate outputs of the optical demultiplexer; and a plurality of optical receivers. Each of the optical receivers is optically connected to a separate output of said second optical switch. The input of the receive edge element is optically connected to the output of the transmit edge element. In some applications the multiplexer in the transmit edge element need not be cyclic.

In some configurations, the optical network may have multiple transmit edge elements feeding an optical combiner and a band demultiplexer connected to the optical combiner. The outputs of the band demultiplexer are connected to multiple receive edge elements.

In an alternate configuration, the optical network may have a central optical switch node having inputs connected to multiple optical combiners, and outputs connected to multiple band demultiplexers. The inputs of the optical combiners are connected to multiple transmit edge elements, and the outputs of the band demultiplexers are connected to multiple receive edge elements.

The central optical switch node in certain configurations contains a plurality of optical channel demultiplexers, optical switch and a plurality of optical channel multiplexers wherein the optical switch cross-connects the outputs of the optical channel demultiplexers to the inputs of the optical channel multiplexers. Under certain conditions the central optical switch may have additional ports, and/or a Optical-Electrical-Optical (OEO) switch.

According to another aspect of the invention there is provided an optical network having an alternative transmit edge element. The alternative transmit edge element has a plurality of tunable optical transmitters and an optical switch. The optical switch has separate inputs each optically connected to an output of one of the plurality of tunable optical transmitters. Half of the outputs of the optical switch connect to the inputs of a first cyclic optical multiplexer, and the other half of the outputs of the optical switch connect to the inputs of a second cyclic optical multiplexer. The outputs of the first and second cyclic optical multiplexers constitute the first and second outputs of the transmit edge element. These outputs have different paths through the network and are connected to the inputs of a 2:1 optical switch. The output of the 2:1 optical switch connect to the input of a receive edge element. The receive edge element has an optical demultiplexer wherein the input of the optical demultiplexer constitutes the input of the receive edge element. The receive edge element also has an optical switch having separate inputs optically connected to the separate outputs of the optical demultiplexer; and a plurality of optical receivers each optically connected to a separate output of the optical switch.

According to yet another aspect of the invention there is provided an optical network having a ring connection joining multiple transmit edge elements and multiple receive edge elements to the central optical switch node. Optical power combiners in a chain configuration are used to join the multiple transmit edge elements. Optical band-droppers, comprising either thin-film band filters or power splitters, are connected in a chain configuration to join the multiple receive edge elements.

Conveniently, protection arrangements may be made for the network, either at the fiber level or at the central network switch level by appropriate connection of optical power splitters and n:1 optical switches.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognise additional implementations, modifications, and embodiments which are within the scope of the present invention as disclosed and claimed herein.

BRIEF DESCRIPTION OF THE DRAWINGS

The invention will be further understood from the following detailed description of embodiments of the invention and accompanying drawings, in which.

In the figures, like elements are given like reference numbers.

DETAILED DESCRIPTION

Figure 1:
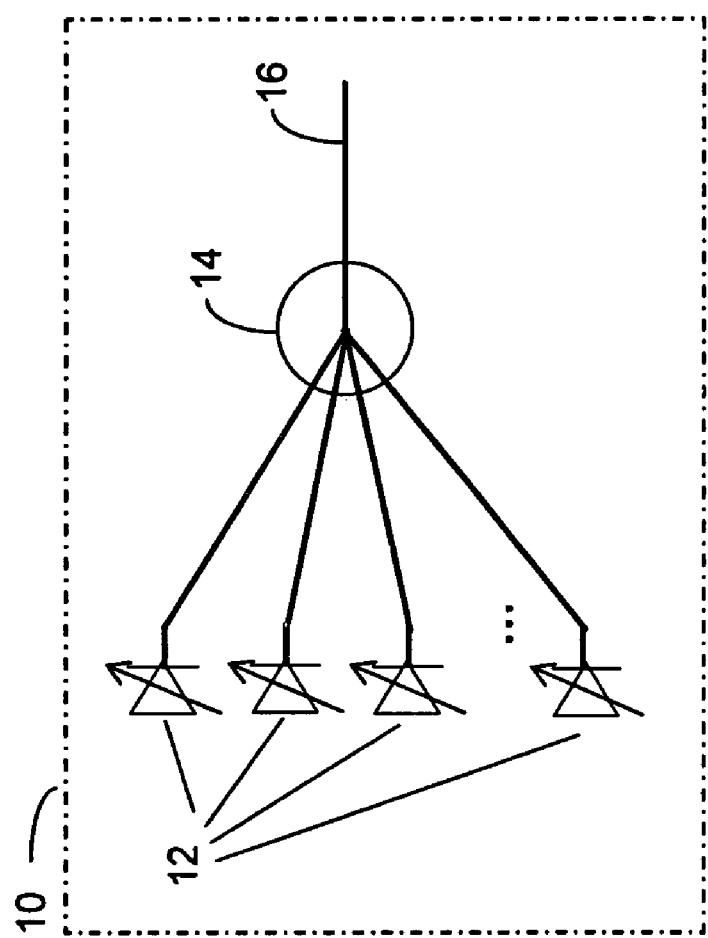
FIG. 1 is a diagram of a power combiner aggregating optical channels as is known in the art.

Referring to FIG. 1, there is illustrated a transmit cluster 10 having a means of combining optical signal channels as is known in the art. Transmit cluster 10 has a plurality of tunable wavelength optical transmitters 12. These typically may be lasers with associated optical modulators. The outputs of the transmitters 12 are optically connected (note: for the purposes of this specification an optical connection means an optical pathway between devices is established according to means well known in the art including such interconnecting devices as necessary to appropriate optical signal transfer, examples of which include optical fiber, connectors, amplifiers, attenuators, dispersion compensators, and the like) to the inputs of optical power combiner 14. The output 16 of optical power combiner 14 provides an aggregated set of optical channels, however has difficulty scaling to larger numbers of optical transmitters.

Figure 2:
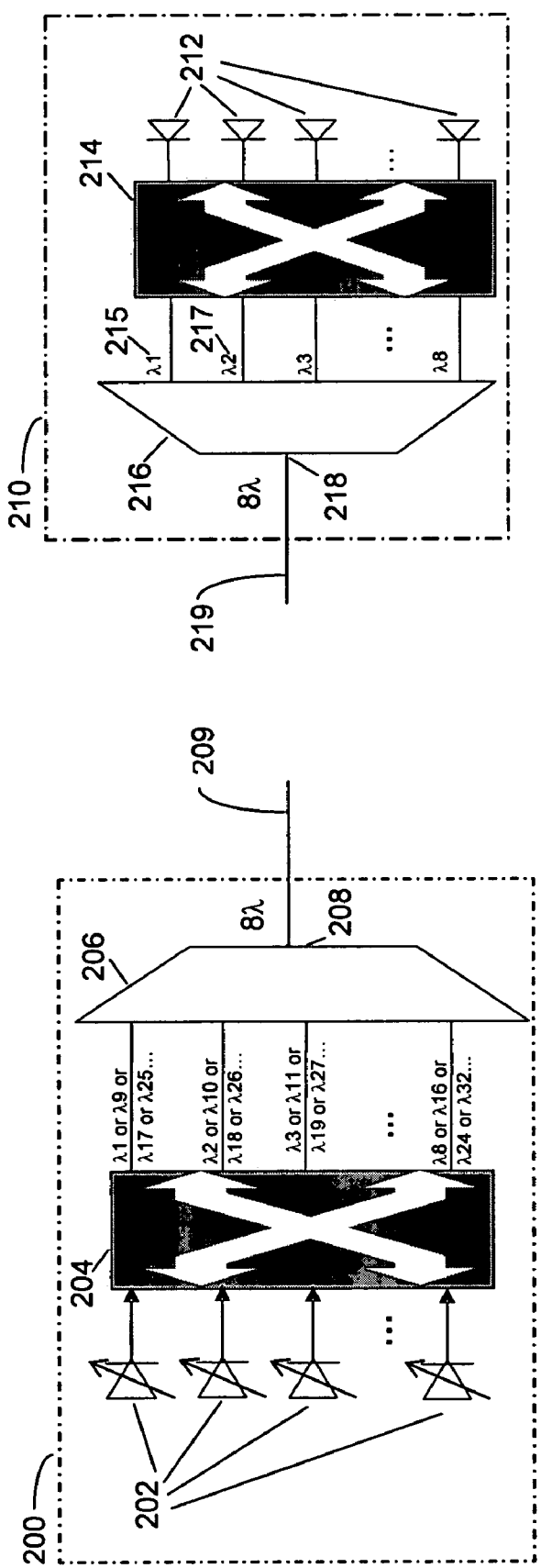
FIG. 2 is a diagram of an example transmit edge element and an example receive edge element according to an embodiment of the invention.

Referring to FIG. 2, there is illustrated a transmit edge element 200 for a photonics network having a plurality of tunable wavelength optical transmitters 202. These typically may be tunable lasers with associated optical modulators. The outputs of the transmitters 202 are optically connected to the inputs of optical switch 204. The outputs of switch 204 are then optically connected to the inputs of cyclic multiplexer 206. Cyclic multiplexer 206 may be any cyclic multiplexer such as a dielectric thin film, but would typically be an arrayed waveguide grating (AWG) cyclic multiplexer. The cyclic multiplexer output 208 constitutes the optical output of the transmit edge element 200. The inherent capability of the transmit edge element as described is for any transmitter among transmitters 202 to provide a wavelength at a desired frequency, say $\lambda_1$, at any of the inputs to optical switch 204. The optical switch 204 then may switch $\lambda_1$ to the appropriate port corresponding to $\lambda 1$ of the inputs of cyclic multiplexer 206, where it will be multiplexed onto the output 208. Output 208 of transmit edge element 200 is connected to output fiber 209 and thence to a network. Due to the cyclic nature of the multiplexer, it handles wavelengths of a cycle higher than $\lambda_1$ in the same manner as $\lambda_1$. As an example, a cyclic AWG with a cycle of 8 channels would handle $\lambda_1$, $\lambda_9$, $\lambda_{17}$, and $\lambda_{25}$ in a like manner upon having any of them connected to the same input port of 206. Under certain applications, it may be possible to use a non-cyclic multiplexer in place of cyclic multiplexer 206, for example where a wavelength plan does not require such.

Turning now to the other part of FIG. 2, there is illustrated a receive edge element 210 for a photonics network having a demultiplexer 216. The input 218 of demultiplexer 216 constitutes the input of the receive edge element 210 and is optically connected via input fiber 219 to a network. As discussed for the cyclic multiplexer 206, the channel demultiplexer 216 may be any demultiplexer such as a dielectric thin film, but would typically be an arrayed waveguide grating (AWG) demultiplexer. The outputs of the channel demultiplexer 216 are then optically connected to the inputs of optical switch 214, and the outputs of optical switch 214 are connected to a plurality of optical receivers 212. An effect of the aforedescribed arrangement is that any wavelength arriving on receive edge element input 218 may be connected to any of the plurality of optical receivers 212 as the demultiplexed wavelength will appear on one of the outputs of the demultiplexer 216 and may then be switched by the optical switch 214 to the desired optical receiver. In some applications the channel demultiplexer 216 could be cyclic, however this is not required for the present networks. Alternatively, it is contemplated that certain applications could use a non-cyclic multiplexer in the transmit edge element. Coupled with the use of a non-cyclic multiplexer would be a larger optical switch to compensate for the non-cyclic nature.

The optical switches 204 and 214 of FIG. 2 are square in terms of having as many outputs as inputs, thus being 4×4 or 8×8 type optical switches for example. In practice, optical receivers 212 will each be assigned the frequency of the particular channel demultiplexer 216 output port is has connection to when the optical switch 214 is performing a straight-through connection. When it is desired to establish a connection between one of the optical transmitters 202 and a given receiver 212, the optical transmitter 202 will be tuned to the appropriate frequency, and a connection established through the network as described previously. The simple photonic network of FIG. 2 suffices for scenarios wherein a limited number of optical channels are required, e.g. 4 or 8 as matched by the optical switches 204 and 214.

Figure 3:
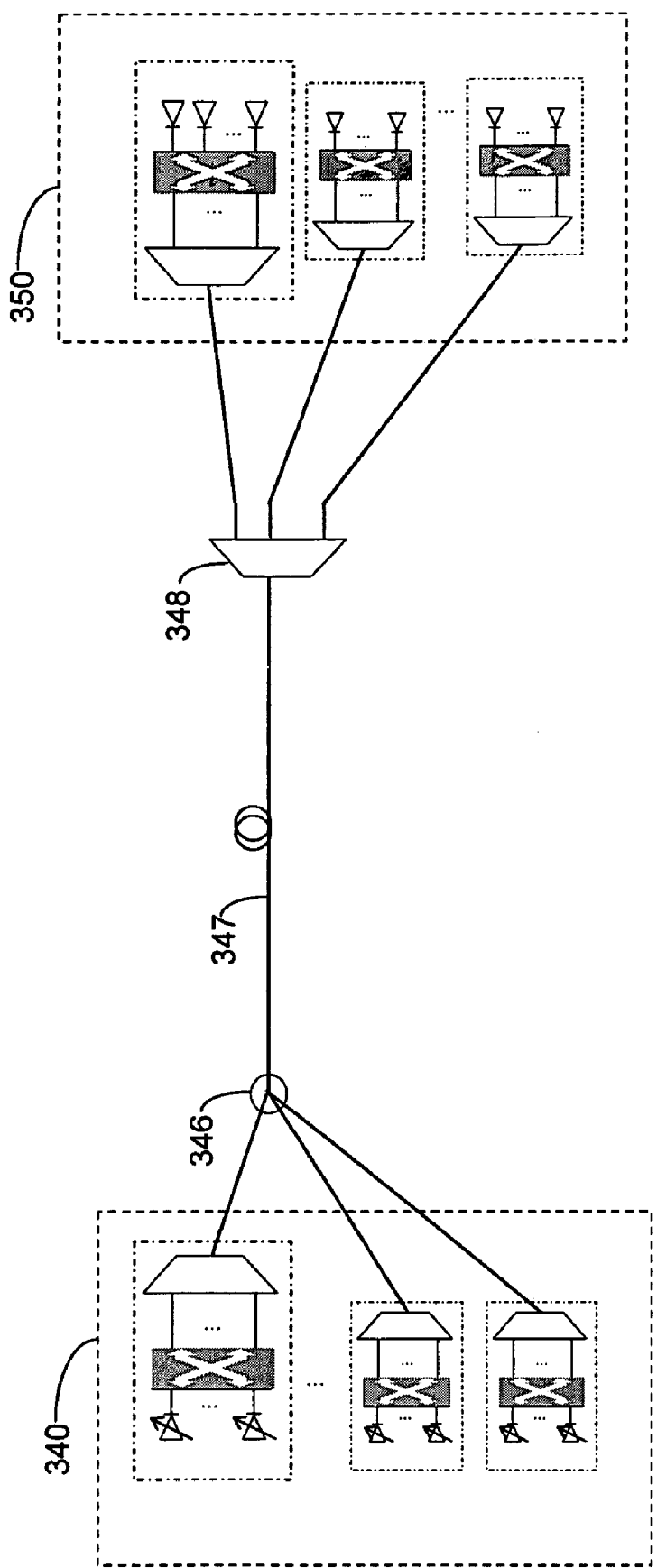
FIG. 3 is a diagram of an example cluster of transmit edge elements connected to a cluster of receive edge elements according to an embodiment of the invention.

Referring to FIG. 3, there is illustrated a scaled-up photonic network in comparison to the network of FIG. 2, according to an embodiment of the invention. In this network, transmit edge element cluster 340 comprises a set of transmit edge elements. The outputs of these transmit edge elements are combined via power combiner 346 and connected via the output of power combiner 346 to the fiber 347. Fiber 347 connects to the input of band demultiplexer 348. The outputs of band demultiplexer 348 are connected to the inputs of the receive edge elements comprising receive edge element cluster 350. In operation, each receive edge element of receive edge element cluster 350 will be assigned a sub-band of frequencies, and optical receivers within each receive edge element will each be assigned a default frequency within the sub-band of that receive edge element. When it is desired to establish a connection between one of the optical transmitters of the transmit edge element cluster 340 and a given receiver, the optical transmitter will be tuned to the appropriate frequency, and a connection established through the network as previously described. The photonic network given in FIG. 3 scales upward in terms of optical receivers and transmitters to the point that the number of available frequencies is exhausted. In this example the optical switches in the receive edge elements are typically not required, however in anticipation of further network expansion they are included.

Figure 4:
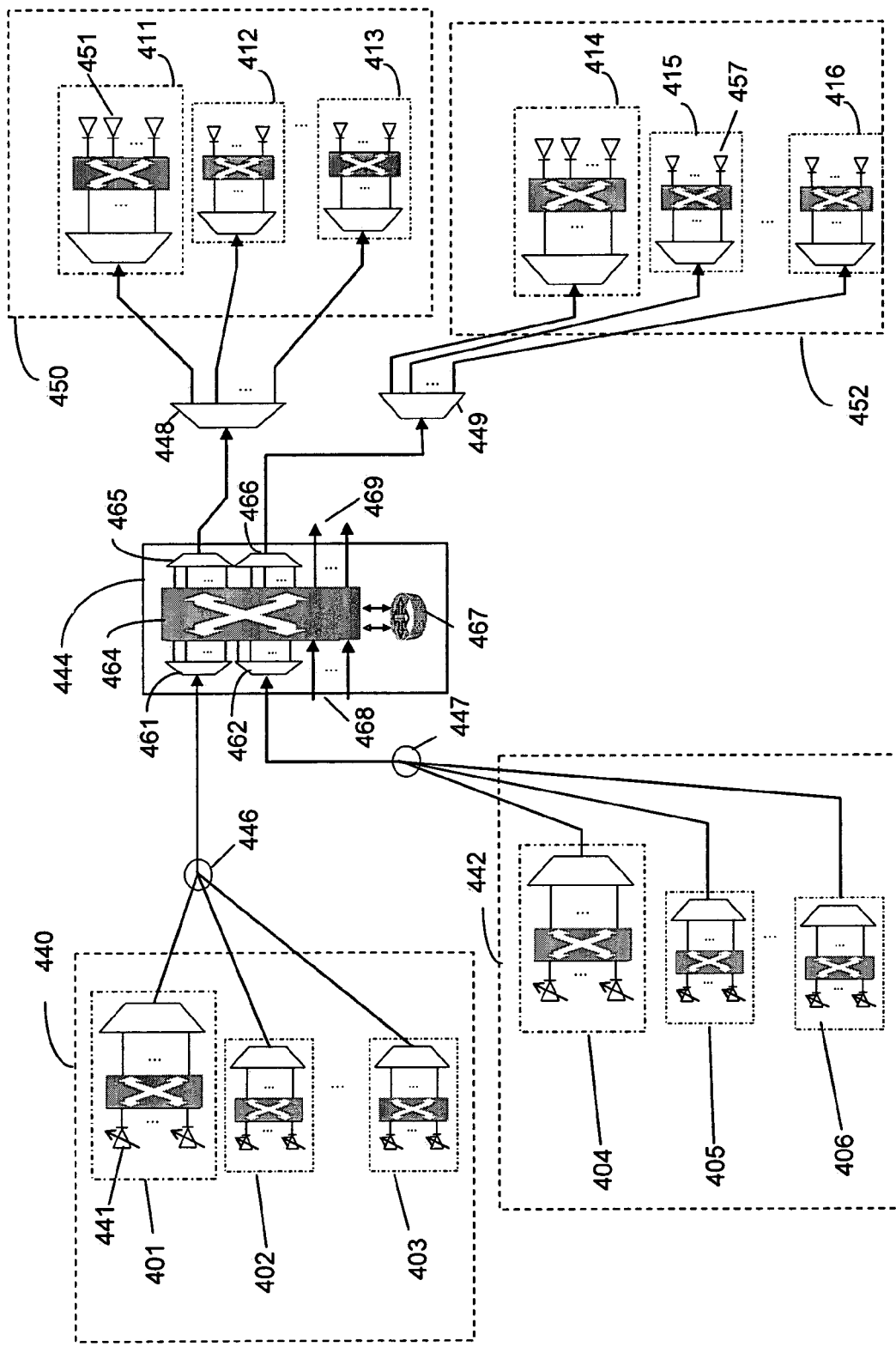
FIG. 4 is a diagram of an example photonic network of multiple clusters of transmit edge elements connected to multiple clusters of receive edge elements according to an embodiment of the invention.

Referring now to FIG. 4, there is illustrated a photonic network architecture according to an embodiment of the invention. A first cluster 440 of customer groups 401, 402, and 403 and a second cluster 442 of customer groups 404, 405, and 406 of transmit edge elements as described in FIG. 2 are optically connected to a central optical node 444. Combining in a single fiber of transmit edge element outputs for a particular cluster occur via optical power combiners 446 and 447 as illustrated. Central optical node 444 contains photonic switch 464 optically coupled to input demultiplexers 461 and 462 and output multiplexers 465 and 466. Central optical node 444 also optionally contains electronic switch 467 and additional optical input ports 468 and optical output ports 469. The additional input and output ports may be used in single channel tributary cards pr sent in the node. The outputs of central optical node 444 are optically connected to band demultiplexers 448 and 449. The outputs of band demultiplexers 448 and 449 are optically coupled to receive edge element inputs. The receive edge elements are grouped into a first cluster 450 of customer groups 411, 412, and 413 and a second cluster 452 of customer groups 414, 415, and 416.

A typical embodiment employing this architecture could have transmit edge elements supporting customers in groups of 8 channels. A cyclic AWG with a 900 GHz free spectral range is used in both transmit and receive edge elements. Customer groups may be located in different locations with the provision of a miniband amplifier as needed in the optical connection between the transmit edge element and the power combiner. The architecture is scalable as a cluster of 32 customers and does not need to be fully populated at installation, but instead groups may be added over time as long as the optical power combiner is initially present. The port size of the central photonic switch will be a function of network size. As an example, if there are ten clusters, each with four groups of eight customer channels, then the size of the central photonic switch should be at least (320+n)×(320+n) where the first term of the expression is the product of the number of clusters, the number of groups, and the number of channels per group; and the second term represents the additional ports required for single channel tributary cards present in the node supporting services such as channels which need to be dropped or added at this location, and for re-grooming and switching of some channels with sub-lambda customers which have alternative destinations. For simplicity of presentation only one central optical node has been illustrated, however the architecture can be extended to pass through multiple central nodes. Additional amplifiers, attenuators, and dispersion compensators may be placed as required to complete the optical connectivity.

The band demultiplexers 448 and 449 could be dielectric thin film filters or AWG if performance permits. Their purpose is to split the signal from the output of central node (the egress trunks) into sub-bands appropriate to the group of wavelengths destined for a particular receive edge element. The sub-bands are unique.

By way of example, referring to FIG. 4, assume that it is desired to establish connectivity between a customer at optical transmitter 441 in customer group 401 (note that in this discussion edge elements correspond to customer groups) and a customer at receiver 451 in customer group 411. Assume the customer at receiver 451 is considered customer number 2 in the customer group 411 and therefore uses $\lambda_2$ as a default. The optical transmitter 441 would be tuned to $\lambda_2$. The optical signals would exit the transmit edge element, proceed through optical power combiner 446, be switched through the central optical node 444 to band demultiplexer 448 where as a member of the wavelength group associated with receive edge element 411, would be delivered to optical receiver 451 with the optical switch of the receive edge element set to a "straight-through" switch setting. Should some other optical receiver in the wavelength group associated with receive edge element 411 be currently using $\lambda_2$ then optical transmitter 441 could be tuned to an alternate wavelength of the same wavelength group 411, for example $\lambda_3$. As the signals arrive at receive edge element 411, the demultiplexed wavelengths would emerge from the demultiplexer at the $\lambda_3$ output port and would be switched to the receiver for customer number 2. As the receivers are wavelength independent, the arrival of the data encoded on $\lambda_3$ will not interfere with reception.

The decision of wavelength allocation at each node will be accomplished by local and global management. It is anticipated that each node will have a lookup table containing the wavelengths available at each receive edge element, and the wavelength allocation at a given time noted as free or in-use. The look-up table would be updated on an ongoing basis as wavelengths are claimed or released from use.

In any particular architectural configuration, wavelength groups will be preferably established taking advantage of particular component availability. For example, a cluster may comprise four customer groups with each customer group having a total of eight wavelengths per customer group for a total of 32 wavelengths in a cluster. Alternatively, smaller edge elements may be deployed with four wavelengths per customer group, with a total of eight customer groups to a cluster; yielding again a total of 32 wavelengths in a cluster. Within a cluster wavelength management is handled by the optical switches within an edge element. To establish connectivity between clusters the central optical switch is employed.

By way of another example referring to FIG. 4, assume that it is desired to establish connectivity between a customer at optical transmitter 441 in customer group 401 and a customer at receiver 457 in customer group 415 in cluster 452. Assume the customer at receiver 457 is considered customer number 8 in cluster 452 and therefore uses $\lambda_8$ as a default, the optical transmitter 441 would be tuned to $\lambda_8$. The optical signals would exit the transmit edge element, proceed through optical power combiner 446, be switched through the central optical switch 444 to, demultiplexer 449 i.e. across to cluster 452 where as a member of the wavelength group associated with receive edge element 415, would be delivered to optical receiver 457 with the optical switch of the receive edge element set to a "straight-through" switch setting.

Should some other optical receiver associated with receive edge element 415 be currently using $\lambda_8$ or any other optical transceivers from the cluster 440 be using $\lambda_8$ or cyclic variation of $\lambda_8$, then optical transmitter 441 could be tuned to an alternate wavelength of the wavelength group, for example $\lambda_5$. As the signals arrive at receive edge element 415, the demultiplexed wavelengths would emerge from the demultiplexer at the $\lambda_5$ output port and would be switched via the internal optical switch of receive edge element 415 to the optical receiver 457. As can be seen, the presence of the optical switch within the receive edge element resolves blocking problems at the receive edge element level.

Figure 5:
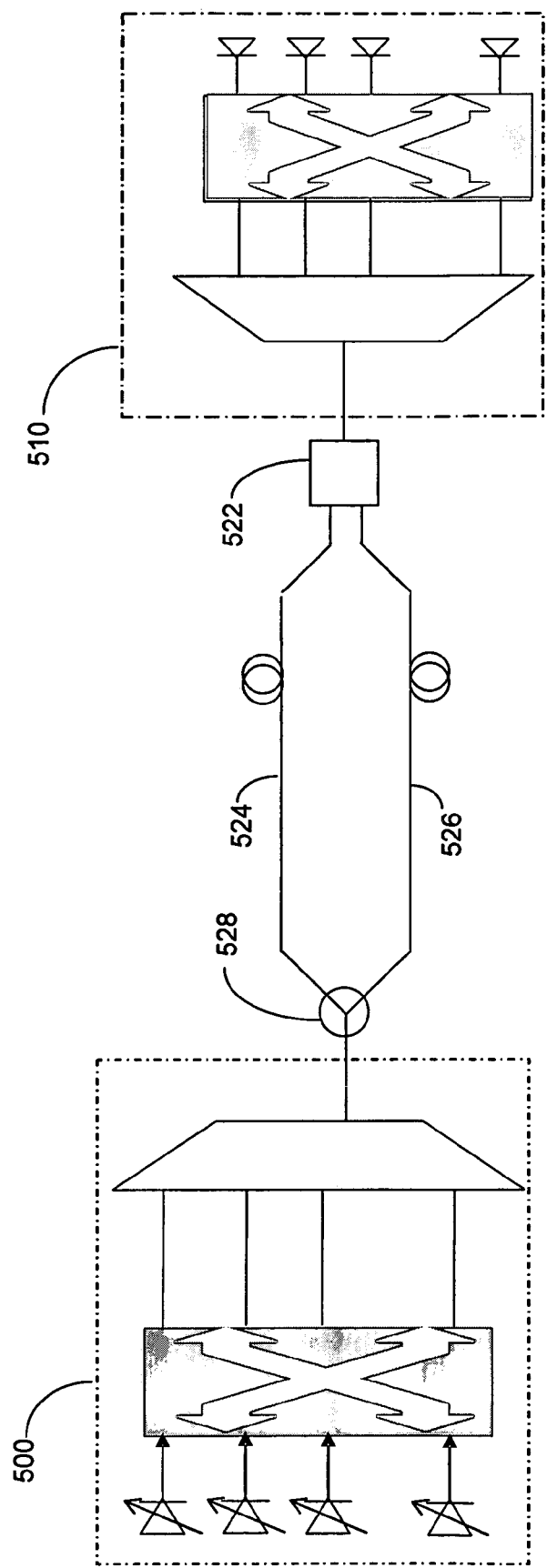
FIG. 5 is a diagram of the example photonic network of FIG. 2 with fiber protection according to an embodiment of the invention.

Referring to FIG. 5, there is illustrated a protected form of the network shown in FIG. 2. Transmit edge element 500 is connected to receive edge element 510. In this particular embodiment, the output of transmit edge element 500 is first connected to optical power splitter 528. The outputs 524 and 526 of optical power splitter 528 travel different paths through the network and are connected to the 2:1 optical switch 522 which has its output connected to the input of receive edge element 510. Should there be a network failure on either path 524 or 526, signalling may be transferred via optical switch 522 to the alternate output maintaining the connection between transmit edge element 500 and receive edge element 510, thereby providing path protection.

Figure 6:
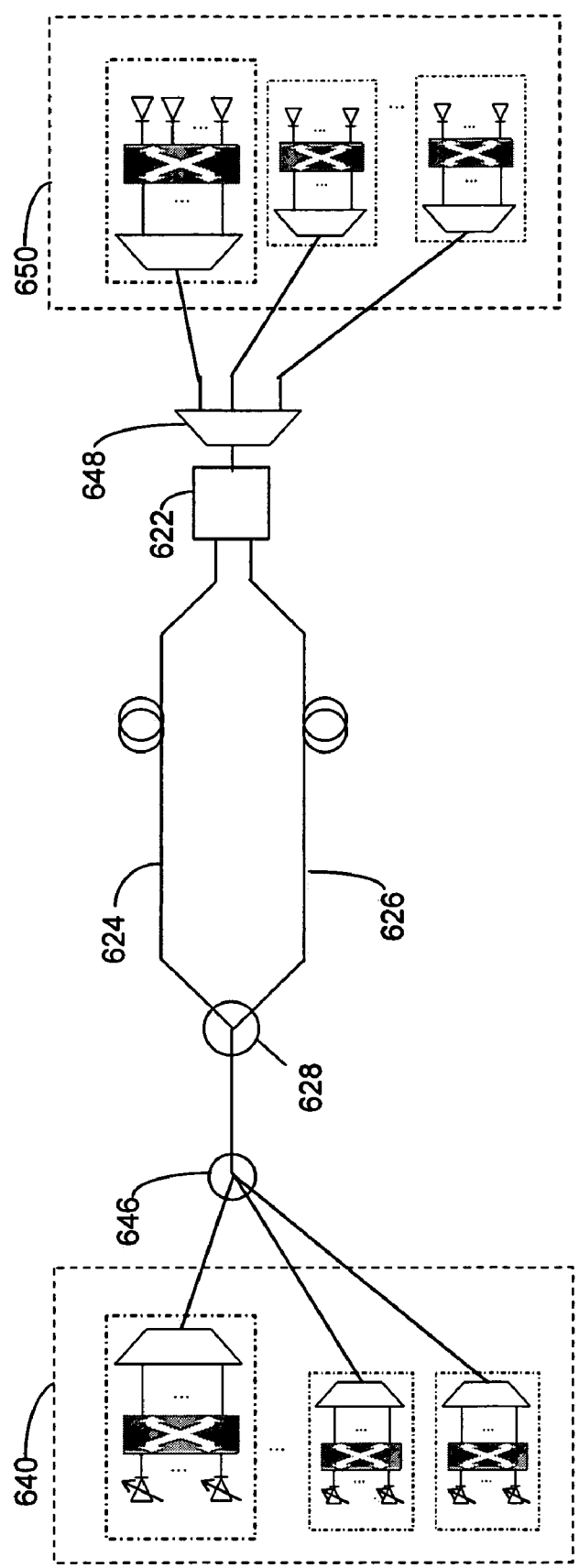
FIG. 6 is a diagram of the example photonic network of FIG. 3 with fiber protection according to an embodiment of the invention.

Referring to FIG. 6, there is illustrated a protected form of the network shown in FIG. 3. Transmit edge element cluster 640 comprises a set of transmit edge elements the outputs of which are combined via power combiner 646. The output of power combiner 646 is connected to optical power splitter 628. The outputs 624 and 626 of optical power splitter 628 are connected to the 2:1 optical switch 622 which has its output connected to the input of band demultiplexer 648. The outputs of band demultiplexer 648 are connected to the inputs of the receive edge elements comprising receive edge element cluster 650. In operation, should there be a network failure on either path 624 or 626, signalling may be transferred via optical switch 622 to the alternate output maintaining the connection between transmit edge element cluster 640 and receive edge element cluster 650, thereby providing path protection.

Figure 7:
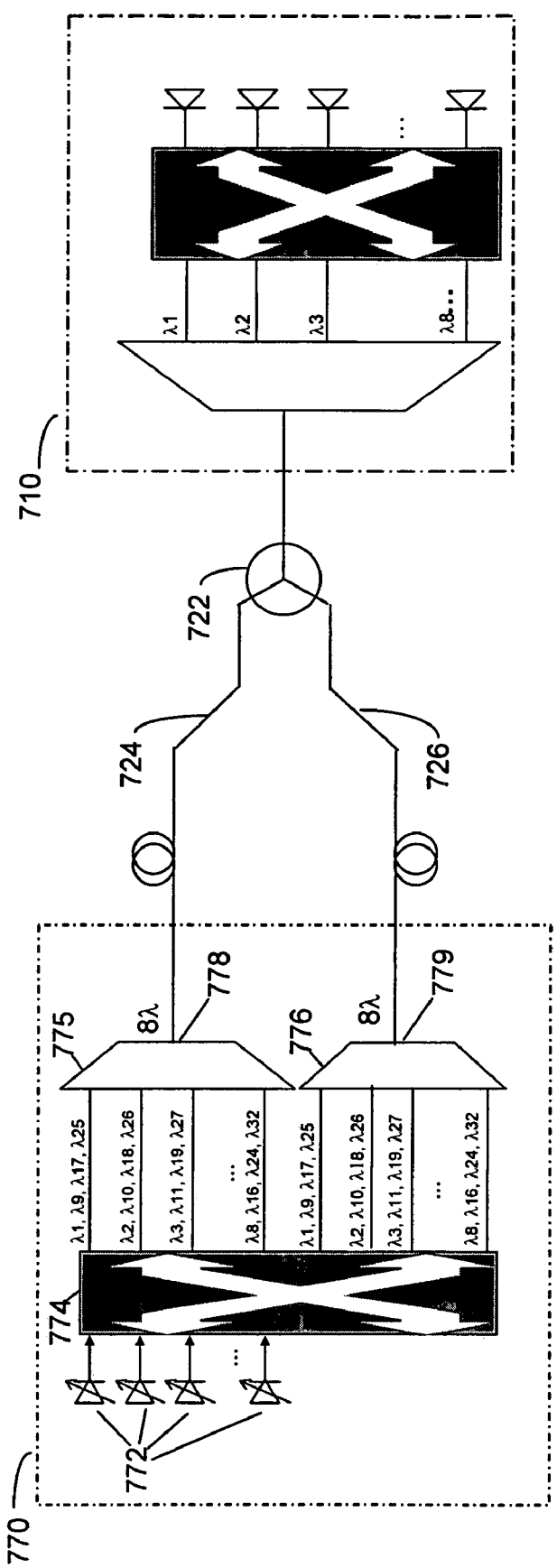
FIG. 7 is a diagram of an example alternative transmit edge element providing fiber protection connected to a receive edge element according to an alternative embodiment of the invention.

Referring to FIG. 7, there is illustrated an alternative construction for a transmit edge element and for a receive edge element photonic network. In this embodiment, transmit edge element 770 has a plurality of tunable wavelength optical transmitters 772 optically connected to the inputs of optical switch 774 as in the previous embodiment. However, optical switch 774 is not square as in the previous embodiment, but instead of a form factor n×(2n) where n is the number of inputs. Optically connected to the doubled outputs are cyclic multiplexers 775 and 776. The advantage of this configuration lies in the redundancy provided by the dual outputs 778 and 779. As two optical outputs emerge from this variation of transmit edge element, provision for a protected network architecture can be had as any of the transmitters 722 may be connected to either output 778 or 779. Optical path 724 connected to output 778 and optical path 726 connected to output 779 are combined by the optical combiner 722. The output of optical combiner 722 is connected to the input of receive edge element 710. Should there be a network failure on either path connected to either output, signalling will be transferred via optical combiner 722 to the alternate output.

Figure 8:
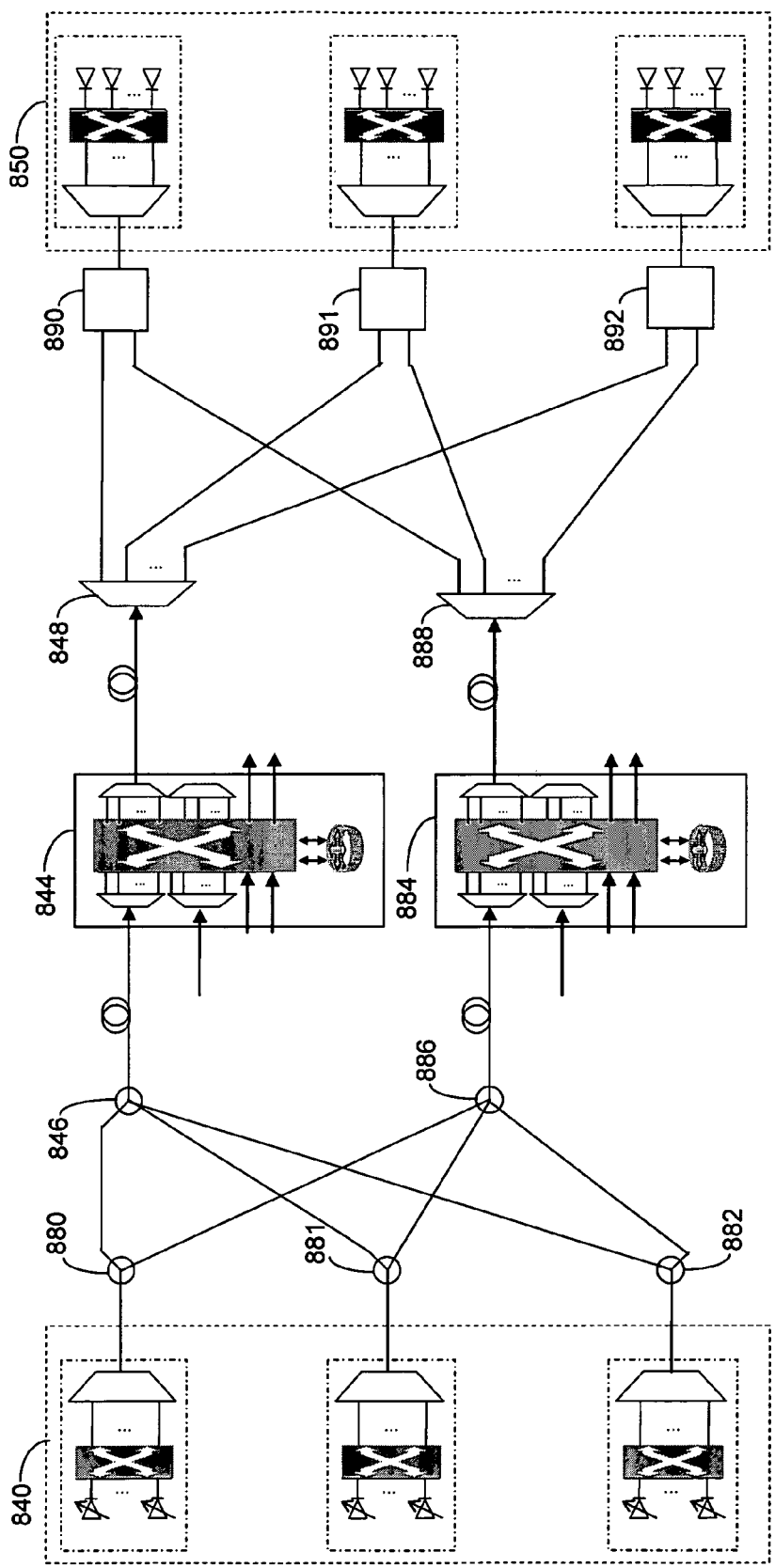
FIG. 8 is a diagram of the example photonic network of FIG. 4 with fiber protection and network switching protection according to an alternative embodiment of the invention.

Referring to FIG. 8, there is provided an alternative embodiment of a photonic network similar to that of FIG. 4, with added fiber and network switch protection. In this embodiment, there is a first cluster 840 of transmit edge elements and a second cluster 850 of receive edge elements. Optical splitters 880, 881, and 882 act to split the optical outputs of the respective transmit edge elements. Power combiner 846 combines the first outputs of the optical splitters 880, 881, and 882 for central optical node 844. Likewise, power combiner 886 combines the second outputs of the optical splitters 880, 881, and 882 for central optical node 884. The output of central optical node 844 is taken to band demultiplexer 848 and thence to the respective receive edge elements via 2:1 optical switches 890, 891, and 892. Likewise, the output of central optical node 884 is taken to band demultiplexer 888 and thence to the respective receive edge elements via 2:1 optical switches 890, 891, and 892. In operation, should there be a network failure on either the paths or network elements connected to one of the central optical nodes 844 or 884, signalling may be transferred via optical switches 890, 891, and 892 to the alternate input maintaining the connection between transmit edge element clusters and receive edge element cluster, thereby providing both path and network protection.

Figure 9:
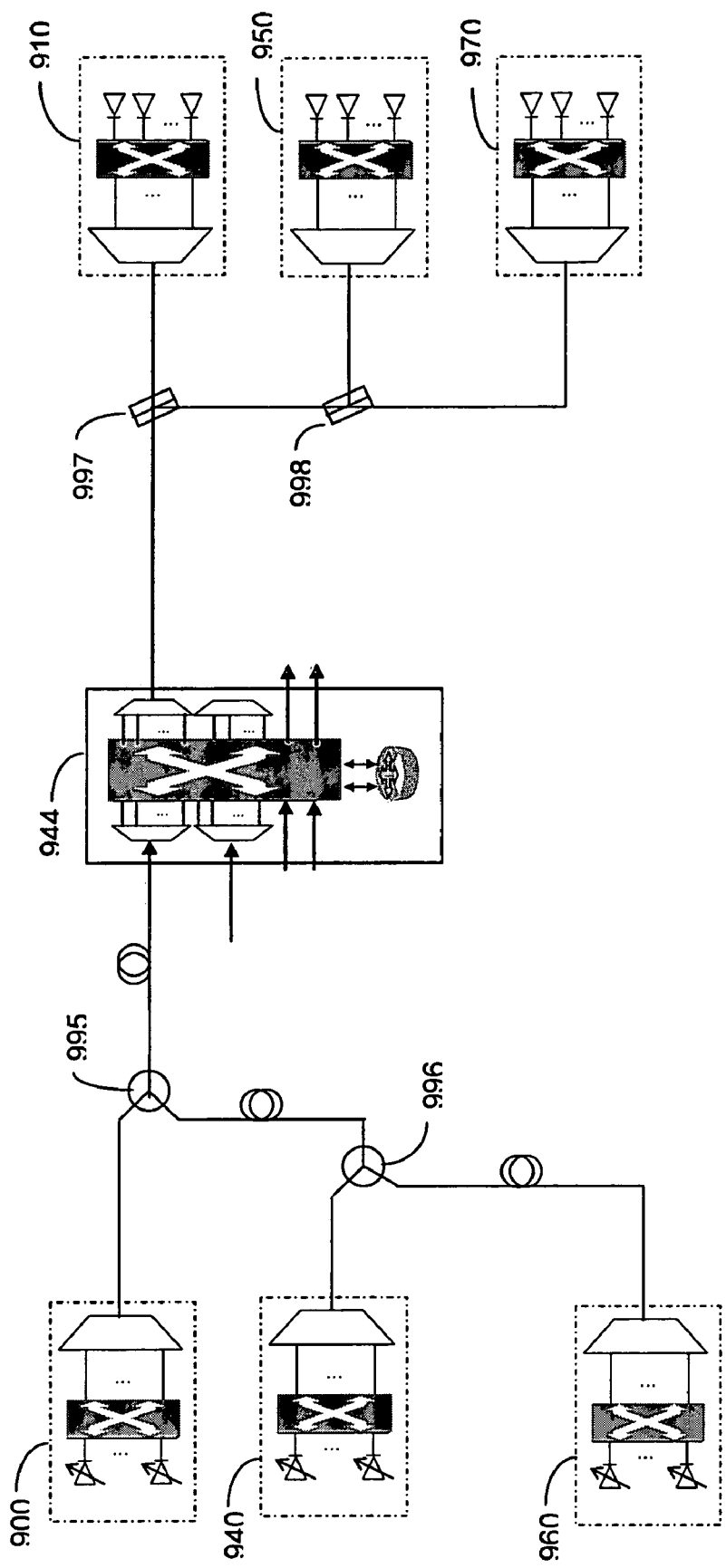
FIG. 9 is a diagram of an example photonic network in a branch configuration according to an alternative embodiment of the invention.

Referring to FIG. 9, there may be seen a diagram of a photonic network in a branch configuration according to an alternative embodiment of the invention. Transmit edge elements 900, 940, and 960 are connected to power combiners 995 and 996 in the configuration shown so that the combined outputs are connected to the input of central optical node 944. The ports of power combiners 995 and 996 may contain taps, variable attenuators, and amplifiers which, operating in conjunction with an optical spectrum analyzer, could ensure that the optical channel power of the added traffic will be equalized to the optical channel power of the incoming traffic. The ratio of the power combiners would be network design dependent, however the amplifiers and attenuators would operate so as to adjust the power of each port such that the power per channel will be matched for all channels at the output port. The output of central optical node 944 is taken to band-drop elements 997 and 998. These band-drop elements would typically be wide-band thin-film drop filters which drop a specific sub-band corresponding to the frequency allocations of each receive edge element 910, 950, and 970. However, in an alternative contemplated configuration, band-drop elements 997 and 998 could comprise optical power splitters for the case where there is no defined band structure or alternatively, where the number of receive edge elements exceeds the number of sub-bands available. The branch configuration offers advantages of reduced fiber due to the channel accumulation.

Figure 10:
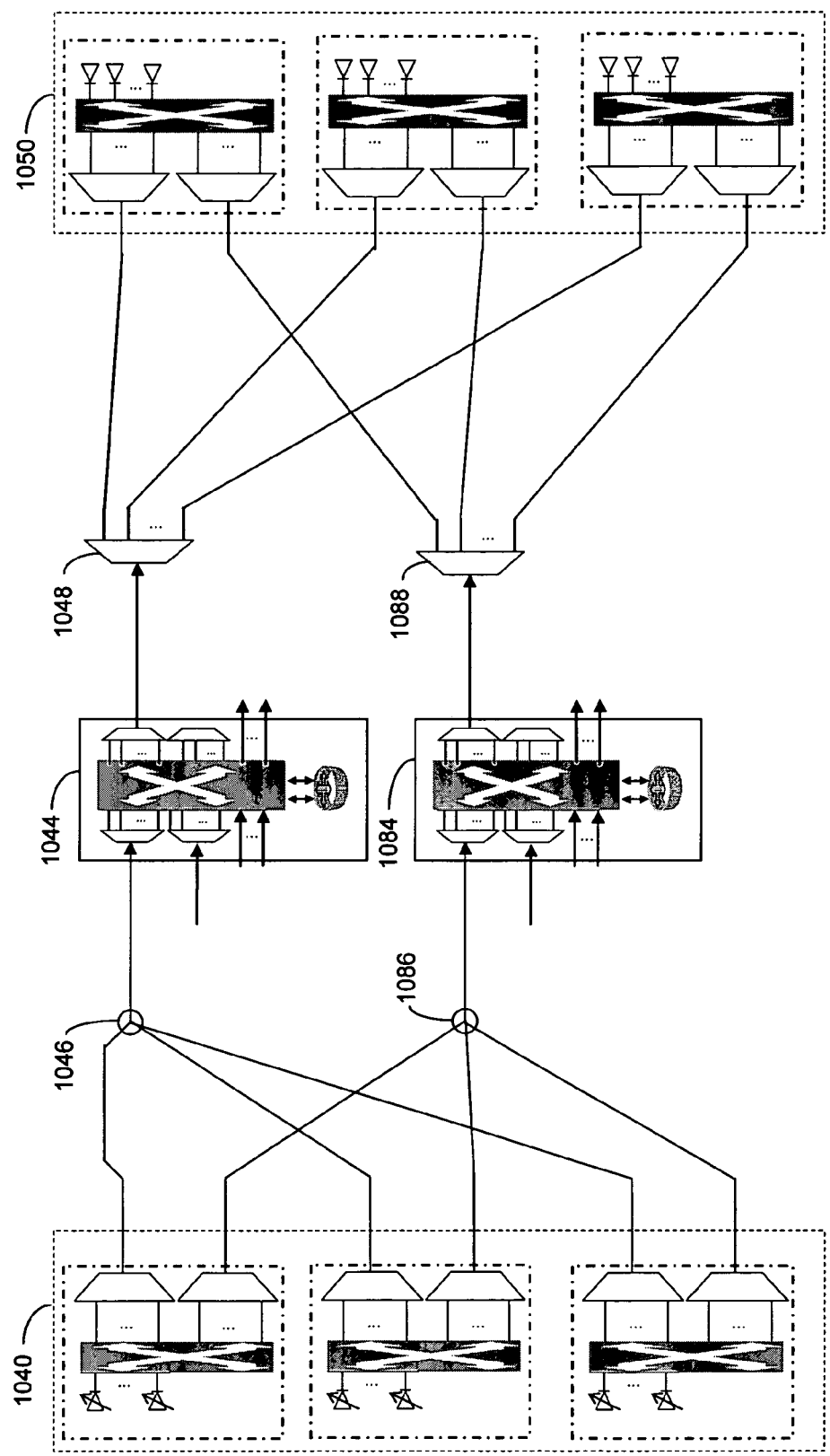
FIG. 10 is a diagram of an example photonic network with fiber protection according to an alternative embodiment of the invention.

Referring to FIG. 10, there is illustrated an alternative construction for a photonic network providing fiber and network switch protection. In this embodiment, the transmit edge elements have non-square optical switches and double output multiplexers as described for the embodiment depicted in FIG. 7. As well, the receive edge elements are configured in a similar manner with non-square optical switches and double input demultiplexers. In this embodiment, there is a first cluster 1040 of transmit edge elements and a second cluster 1050 of receive edge elements. Power combiner 1046 combines the first outputs of the transmit edge elements for central optical node 1044. Likewise, power combiner 1086 combines the second outputs the transmit edge elements for central optical node 1084. The output of central optical node 1044 is taken to band demultiplexer 1048 and thence to the respective first inputs of the receive edge elements. Likewise, the output of central optical node 1084 is taken to band demultiplexer 1088 and thence to the respective second inputs of the receive edge elements. In operation, should there be a network failure on either the paths or network elements connected to one of the central optical nodes 1044 or 1084, signalling may be transferred via the optical switches within the transmit and receive edge elements to the alternate multiplexers and demultiplexers respectively, maintaining the connection between transmit edge element clusters and receive edge element cluster, thereby providing both path and network protection.

In general, for a photonic network having:
a channel spacing of X GHz;
channel groups of M channels;
channel spacing between channel groups of S skipped channels; and
a total of P channel groups available in an available optical band, the total number of channels available with separate wavelengths may be calculated as the product of M and P, i.e. (M×P). Further, this total number of channels occupies a spectrum of bandwidth which may be calculated as:

[((M+S)×P)−S]×X

For specific applications, S may be set to {0, 1, 2, ... } as per a wavelength plan. Also X may be 100 GHz, 50 GHz, or 25 GHz. The total number of channel groups available, P, may be 4, 5, ..., 9 or higher. In typical applications M may be 4 or 8, but M may assume other values as needed in specific applications.

For the cyclic AWG used for multiplexing in the transmit edge element, the Free Spectral Range (FSR) required may be calculated according to the formula:

(M+S)×X.

For the non-redundant edge element the switch size is:
M by M.

The group multiplexer which directs the channels to the receive edge elements has a required bandwidth for each output of:

(M−1)×X.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An optical network comprising:
a transmit edge element having
a plurality of tunable optical transmitters,
an optical switch having separate inputs each optically connected to an output of one of said plurality of tunable optical transmitters,
a optical multiplexer having separate inputs each optically connected to a separate output of said optical switch, and
the output of said optical multiplexer constituting the output of said transmit edge element;
a receive edge element having
an optical demultiplexer wherein the input of said optical demultiplexer constitutes the input of said receive edge element,
an optical switch having separate inputs optically connected to the separate outputs of said optical demultiplexer; and
a plurality of optical receivers each optically connected to a separate output of said second optical switch;
an optical power splitter, optically connected to the output of said optical transmit edge element, said optical power splitter having a plurality of outputs;
a n:1 optical switch wherein n is of a quantity sufficient to accommodate said plurality of outputs of said optical power splitter;
said plurality of outputs of said optical power splitter are optically connected to separate inputs of said n:1 optical switch; and
the output of said n:1 optical switch is optically connected to the input of said
receive edge element.

2. An optical network comprising:
a transmit edge element having
a plurality of tunable optical transmitters,
an optical switch having separate inputs each optically connected to an output of one of said plurality of tunable optical transmitters,
a optical multiplexer having separate inputs each optically connected to a separate output of said optical switch, and
the output of said optical multiplexer constituting the output of said transmit edge element;
a receive edge element having
an optical demultiplexer wherein the input of said optical demultiplexer constitutes the input of said receive edge element,
an optical switch having separate inputs optically connected to the separate outputs of said optical demultiplexer; and
a plurality of optical receivers each optically connected to a separate output of said second optical switch
an optical power combiner having an input connected to the output of said transmit edge element;
a plurality of additional transmit edge elements each having an output optically connected to a separate input of said optical power combiner; and
an additional optical band demultiplexer, optically interposed between an output of said optical power combiner and an input of said receive edge element; and
a plurality of additional receive edge elements each having an input optically connected to a separate output of said additional optical band demultiplexer.

3. An optical network as claimed in claim 2 further comprising:
an optical power splitter, optically connected to the output of said optical power combiner, said optical power splitter having a plurality of outputs;

a n:1 optical switch wherein n is of a quantity sufficient to accommodate said plurality of outputs of said optical power splitter;

said plurality of outputs of said optical power splitter are optically connected to separate inputs of said n:1 optical switch; and the output of said n:1 optical switch is optically connected to the input of said additional optical band demultiplexer.

4. An optical network comprising:

a transmit edge element having
- a plurality of tunable optical transmitters,
- an optical switch having separate inputs each optically connected to an output of one of said plurality of tunable optical transmitters,
- a optical multiplexer having separate inputs each optically connected to a separate output of said optical switch, and
- the output of said optical multiplexer constituting the output of said transmit edge element;

a receive edge element having
- an optical demultiplexer wherein the input of said optical demultiplexer constitutes the input of said receive edge element.

5. An optical network as claimed in claim 4 wherein said first and second optical band droppers comprise thin-film drop filters.

6. An optical network as claimed in claim 4 wherein said first and second optical band droppers comprise optical power splitters.

7. An optical network comprising:

a first cluster of transmit edge elements, each transmit edge element having a plurality of tunable optical transmitters, an optical switch having separate inputs each optically connected to an outputs of one of said plurality of tunable optical transmitters, a cyclic optical multiplexer having separate inputs each optically connected to a separate output of said optical switch, wherein the output of said cyclic optical multiplexer constituting the output of said transmit edge element;

a first optical power combiner having an input connected to the output of each transmit edge element of said first cluster of transmit edge elements;

a second cluster of transmit edge elements, each transmit edge element having a plurality of tunable optical transmitters, an optical switch having separate inputs each optically connected to an outputs of one of said plurality of tunable optical transmitters, a cyclic optical multiplexer having separate inputs each optically connected to a separate output of said optical switch, wherein the output of said cyclic optical multiplexer constituting the output of said transmit edge element;

a second optical power combiner having an input connected to the output of each transmit edge element of said second cluster of transmit edge elements;

a first cluster of receive edge elements, each receive edge element having an optical demultiplexer wherein the input of said optical demultiplexer constitutes the input of said receive edge element, an optical switch having separate inputs optically connected to the separate outputs of said optical demultiplexer; and a plurality of optical receivers each optically connected to a separate output of said second optical switch;

a first optical band demultiplexer having outputs separately connected to the inputs of each receive edge element of said first cluster of receive edge elements;

a second cluster of receive edge elements, each receive edge element having an optical demultiplexer wherein the input of said optical demultiplexer constitutes the input of said receive edge element, an optical switch having separate inputs optically connected to the separate outputs of said optical demultiplexer; and a plurality of optical receivers each optically connected to a separate output of said second optical switch;

a second optical band demultiplexer having outputs separately connected to the inputs of each receive edge element of said second cluster of receive edge elements; and a central optical switch node optically connected between the output of said first and second optical power combiners and the inputs of said first and second optical band demultiplexers.

8. An optical network as claimed in claim 7 wherein said central optical switch node comprises:

an optical switch;

a plurality of optical channel demultiplexers, the outputs of said plurality of optical channel demultiplexers connected to the inputs of said optical switch, and the inputs of said plurality of optical channel demultiplexers connected to the outputs of said first and second optical power combiners;

a plurality of optical channel multiplexers, the inputs of said plurality of optical channel multiplexers connected to the outputs of said optical switch, and the outputs of said plurality of optical channel multiplexers connected to the inputs of said first and second optical band demultiplexers; and wherein the size of said optical switch is sufficient to cross-connect any output of said plurality of optical channel demultiplexers to any input of said plurality of optical channel multiplexers.

9. An optical network as claimed in claim 8 wherein said central optical switch node further comprises additional input ports and additional output ports for said optical switch.

10. An optical network as claimed in claim 8 wherein said central optical switch node further comprises an optical-to-electrical-to-optical switch.

11. An optical network comprising:

a cluster of transmit edge elements, each transmit edge element having a plurality of tunable optical transmitters, an optical switch having separate inputs each optically connected to an outputs of one of said plurality of tunable optical transmitters, a cyclic optical multiplexer having separate inputs each optically connected to a separate output of said optical switch, wherein the output of said cyclic optical multiplexer constituting the output of said transmit edge element;

a plurality of optical splitters, each respective optical splitter having an input connected to the output of a respective transmit edge element of said cluster of transmit edge elements;

a first optical power combiner having an input connected to a first output of each optical power splitter of said plurality of optical splitters;

a second optical power combiner having an input connected to a second output of each optical power splitter of said plurality of optical splitters;

a first central optical switch node having inputs optically connected to the output of said first optical power combiner;

a second central optical switch node having inputs optically connected to the output of said second optical power combiner;
a cluster of receive edge elements, each receive edge element having an optical demultiplexer wherein the input of said optical demultiplexer constitutes the input of said receive edge element, an optical switch having separate inputs optically connected to the separate outputs of said optical demultiplexer; and a plurality of optical receivers each optically connected to a separate output of said second optical switch;
a first optical band demultiplexer having an input connected to the output of said first central optical switch node;
a second optical band demultiplexer having an input connected to the output of said second central optical switch node; and
a plurality of 2:1 optical switches each having an output associated with an input of a respective receive edge element of said cluster of receive edge elements, and having a first input connected to an output of said first optical band demultiplexer, and a second input connected to an output of said second optical band demultiplexer.

12. An optical network as claimed in claim 11 wherein each said central optical switch node comprises:
an optical switch;
a plurality of optical channel demultiplexers, the outputs of said plurality of optical channel demultiplexers connected to the inputs of said optical switch, and the inputs of said plurality of optical channel demultiplexers connected to the outputs of said first and second optical power combiners;
a plurality of optical channel multiplexers, the inputs of said plurality of optical channel multiplexers connected to the outputs of said optical switch, and the outputs of said plurality of optical channel multiplexers connected to the inputs of said first and second optical band demultiplexers; and
wherein the size of said optical switch is sufficient to cross-connect any output of said plurality of optical channel demultiplexers to any input of said plurality of optical channel multiplexers.

13. An optical network as claimed in claim 12 wherein said central optical switch node further comprises additional input ports and additional output ports for said optical switch.

14. An optical network as claimed in claim 12 wherein said central optical switch node further comprises an optical-to-electrical-to-optical switch.

15. An optical network comprising:
a first transmit edge element having
a plurality of tunable optical transmitters,
an optical switch having separate inputs each optically connected to an outputs of one of said plurality of tunable optical transmitters,
a first cyclic optical multiplexer having separate inputs each optically connected to a separate output of said optical switch,
a second cyclic optical multiplexer having separate inputs each optically connected to a separate output of said optical switch, and
the outputs of said first and second cyclic optical multiplexers constituting the first and second outputs of said transmit edge element;
a 2:1 optical combiner having a first input connected to said first output of said transmit edge element, and having a second input connected to said second output of said transmit edge element; and
a receive edge element having
a optical demultiplexer wherein the input of said optical demultiplexer constitutes the input of said receive edge element,
an optical switch having separate inputs optically connected to the separate outputs of said optical demultiplexer; and
a plurality of optical receivers each optically connected to a separate output of said second optical switch;
wherein the input of said receive edge element is connected to the output of said 2:1 optical combiner.

16. An optical network comprising:
a cluster of transmit edge elements, each transmit edge element having a plurality of tunable optical transmitters, an optical switch having separate inputs each optically connected to an outputs of one of said plurality of tunable optical transmitters, a first cyclic optical multiplexer having separate inputs each optically connected to a separate output of said optical switch, a second cyclic optical multiplexer having separate inputs each optically connected to a separate output of said optical switch, and the outputs of said first and second cyclic optical multiplexers constituting the first and second outputs of said transmit edge element;
a first optical power combiner having an input connected to a first output of each transmit edge element of said cluster of transmit edge elements;
a second optical power combiner having an input connected to a second output of each transmit edge element of said cluster of transmit edge elements;
a first central optical switch node having inputs optically connected to the output of said first optical power combiner;
a second central optical switch node having inputs optically connected to the output of said second optical power combiner;
a cluster of receive edge elements, each receive edge element having an first and second optical demultiplexer wherein the inputs of said optical demultiplexers constitutes the first and second inputs of said receive edge element respectively, an optical switch having separate inputs optically connected to the separate outputs of said optical demultiplexer; and a plurality of optical receivers each optically connected to a separate output of said second optical switch;
a first optical band demultiplexer having an input connected to the output of said first central optical switch node and having outputs connected to said first inputs of said receive edge elements of said cluster of receive edge elements; and
a second optical band demultiplexer having an input connected to the output of said second central optical switch node and having outputs connected to said second inputs of said receive edge elements of said cluster of receive edge elements.

17. An optical network as claimed in claim 16 wherein each said central optical switch node comprises:
an optical switch;
a plurality of optical channel demultiplexers, the outputs of said plurality of optical channel demultiplexers connected to the inputs of said optical switch, and the inputs of said plurality of optical channel demultiplexers connected to the outputs of said first and second optical power combiners;

a plurality of optical channel multiplexers, the inputs of said plurality of optical channel multiplexers connected to the outputs of said optical switch, and the outputs of said plurality of optical channel multiplexers connected to the inputs of said first and second optical band demultiplexers; and wherein the size of said optical switch is sufficient to cross-connect any output of said plurality of optical channel demultiplexers to any input of said plurality of optical channel multiplexers.

18. An optical network as claimed in claim 17 wherein said central optical switch node further comprises additional input ports and additional output ports for said optical switch.

19. An optical network as claimed in claim 17 wherein said central optical switch node further comprises an optical-to-electrical-to-optical switch.

* * * * *